UNITED STATES PATENT OFFICE.

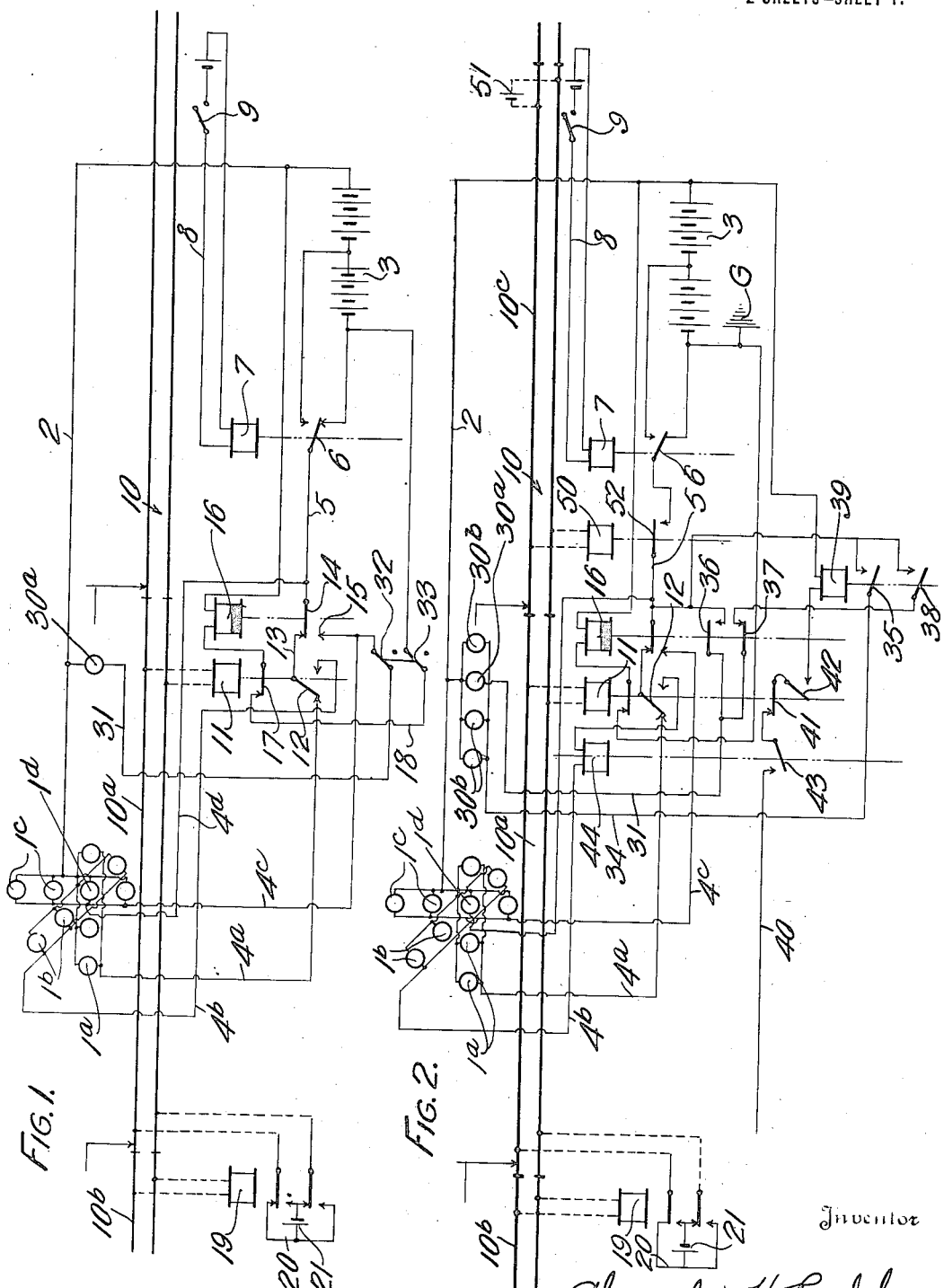

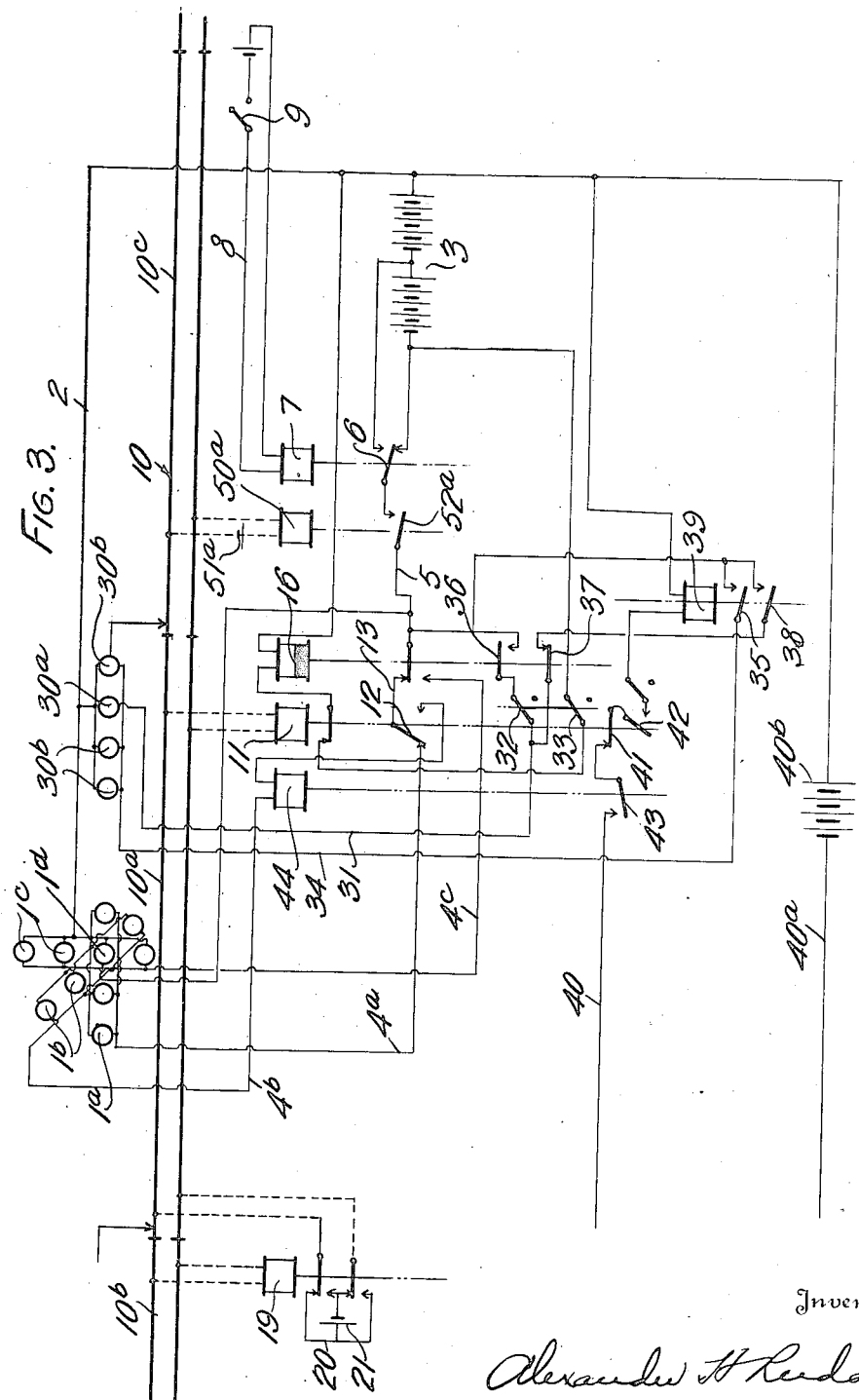

ALEXANDER H. RUDD, OF MEDIA, PENNSYLVANIA, ASSIGNOR TO THE POSITION-LIGHT SIGNAL COMPANY, A CORPORATION OF MAINE.

SIGNALING SYSTEM.

1,214,375.  Specification of Letters Patent.   Patented Jan. 30, 1917.

Application filed May 26, 1916. Serial No. 100,143.

*To all whom it may concern:*

Be it known that I, ALEXANDER H. RUDD, a citizen of the United States of America, and a resident of Media, Pennsylvania, have invented certain new and useful Improvements in Signaling Systems, of which the following is a specification.

The elements in use in railway signals cannot well be individually given more than four indicative positions, and thus the number of indications that each of such elements can give, is likewise limited. To increase this signaling capacity, it has been proposed to associate two elements, one generally located above the other (such elements being, for convenience, herein termed "upper and lower elements"), and to give various signals by the combinations of the indications of the two elements. Thus a vertical position of the upper element may indicate "proceed;" an inclined position "proceed-prepared to stop at next signal," and a horizontal position "stop." A horizontal position of the upper element accompanying a display of the lower element may be used to indicate "stop, then proceed." Again, an inclined position of the upper element with a vertical position of the lower element may indicate "proceed-prepared to pass next signal at medium speed." In both of the last cases it will be noted that the indication of the lower element renders the indication of the upper element more favorable.

Briefly stated, my invention comprises,—
(1) Means for preventing, upon shifting circuit connections to change from one indication to another indication, the undesired momentary display of a third indication, this being especially applicable when polarized direct current track circuits are used, and the signals are light signals. (2) Means whereby an operator can take control of an automatic signaling system having compound signals to cause the display by one element of a desired indication, and to cause the display of the other element thereof, or the display of a desired indication by the latter, to modify the meaning of the indication afforded by the first named element. (3) Means whereby the signaling circuits of compound signals are electrically interlocked to prevent the display of the indications by one element thereof other than those appropriate to and intended for display with the indication displayed by the other element, and whereby the display of an indication by one element is made dependent upon the presence of a lighting current in the desired signal units of the other element. (4) Means for reducing the consumption of current in light signals by including such signals in a normally open lighting circuit, with means for closing such lighting circuit through proper signaling branches upon the approach of a train, such last named means including either normally open or normally closed track circuits.

It further consists in the arrangement and operation of the several parts of which it is composed, as will be hereinafter more fully described and claimed.

Referring to the accompanying drawings, in which corresponding parts are designated by corresponding marks of reference, Figure 1 is a diagram of a signaling system having some of the features of the invention herein disclosed applied thereto. Fig. 2 is a similar diagram, containing other features of the invention herein disclosed; and Fig. 3 is a diagram embodying all of the features of the invention herein disclosed.

I have in the accompanying drawings, shown my invention as embodied in position-light signals, that is to say, in signals in which the indication is given by the relative position of lights or illuminated surfaces. For a fuller discussion of such signals references may be had in Patent #1,175,339, granted March 14, 1916, to William Churchill and myself. It is obvious, however, that many of the inventive matters herein contained are not restricted to such signals, but may be embodied in other types of signals, and wherever I desire to limit my invention to signals whose indication is determined by the relative position of lights or illuminated sources in respect of each other, I will, in the claims, refer to position-light signals, while when I desire to limit my claims of invention to the display of illuminated sources as signals, I will refer to light signals. The upper element of a composite signal may, therefore, but not necessarily, be formed of horizontal, vertical and inclined rows of lamps, and the indications thereof may be determined by the row of such lamps that is illuminated, while the lower element may be, but not necessarily, formed by one or more lamps suitably arranged with means for illuminating one or all of them at will, and I will describe my invention with this understanding.

The individual parts of the apparatus used in the embodiment of the invention herein shown is of construction forming a part of the published art at the date of filing the application for this patent, and it will not be necessary for me to describe the construction of such parts in detail, but merely to describe the connections, arrangement and operation of such known parts whereby the results here sought to be obtained are accomplished.

In all of the figures, the upper element 1 consists of lamps 1$^a$ arranged in a vertical row, and an inclined row of lamps 1$^b$, and a horizontal row of lamps 1$^c$, with a lamp 1$^d$ at the intersection of the rows. A common wire 2 leads from all the lamps to one end of a source of potential 3, while the lamps 1$^a$, 1$^b$, 1$^c$ and 1$^d$ are connected by the branch leads 4$^a$, 4$^b$, 4$^c$ and 4$^d$, respectively, and the lead 5, and certain other elements and parts to a switch 6 adapted to connect with the opposite end, or with an intermediate point of the potential source, to give different voltages on the lamps as described in the aforesaid patent. The branch circuits thus formed are herein termed signaling circuits, in that through them the current flows which is the proximate cause of the signal indication. They are also, when the signals are light signals, lighting circuits.

The switch 6 may be actuated by a relay 7, the energization of which is due to a line 8 having a control switch 9. By proper manipulation of this switch, the voltage thrown on the different branches of the signal circuit may be varied, and such source 3 may therefore be called a multiple potential source, while the leads 4$^a$, 4$^b$ and 4$^c$ may be termed, respectively, from the indications given when current flows therethrough, "clear," "caution" and "stop" signal leads. The "clear" and "caution" leads are both "proceed" leads. The track 10 is shown divided into blocks by the usual track-insulations.

In the drawings, the home-block protected by the signal shown is marked 10$^a$, and the advance block 10$^b$. A signal relay 11 is shown connected across the rails of the home-block and its polarized armature 12 may make contact either with the clear lead 4$^a$, or with the caution lead 4$^b$. The pivot of the armature 12 is connected to a point 13 forming one of the contact stops of an armature 14, the other stop of which is a point 15 connected with the stop lead 4$^c$. The pivotal point of the armature 14 is connected with the lead 5, and a relay 16 is connected in series with the source 3, its circuit when closed including a neutral armature 17 controlled by the track-relay 11, and a lead 18. A track relay 19 is connected across the rails of the advance block 10$^b$ and controls a polarity switch 20 adapted to reverse the connections of a track battery 21 with the rails of the home-block. The parts above described are so arranged that with the train in the home-block (whether or not one be present in the advance block) the signal relay 11 will be deenergized, breaking the circuit of the relay 16 and causing it to drop its armature 14 on the stop contact 15 to close the circuit of the horizontal row of lamps to give a stop indication. This breaks the circuit through the clear and caution leads 4$^a$ and 4$^b$. If, however, there is a train in the advance block and none in the home-block, the pole-changer 20 will be so thrown as to send current of proper polarity through the relay 11 to cause its polarized armature 12 to contact with the caution lead 4$^b$. The presence of current in the relay 11 will also energize its neutral armature 17 to close the circuit of the relay 16, so that the armature 14 of the last-named relay will break the circuit through the stop lead 4$^c$, and be drawn into contact with the point 13, thus completing circuit through the polarized armature 12 and caution lead 4$^b$, lighting the inclined row of lamps to give a "proceed-prepared to stop at next signal" indication. If there is no train in either the home or advance block, the polarized relay will be held against the stop connected with the clear lead 4$^a$, and the "proceed" indication will be given.

In connection with the general system above described, I have provided certain additional features, which, while capable of use in connection with each other, are also capable of independent use.

As light signals are excessively quick in action, the relay 16 is, by preference, so constructed as to have a time-interval, or the movement of its armature 14 may be retarded in some way, in order to prevent quick movement of the latter, and thus prevent the giving for a moment, of a "stop" indication, due to a momentary opening of the circuit of the relay 16 on the change of the polarity of the relay 11 in changing from "caution" to "clear," and to prevent the armature 14 from contacting with its stop 13 before the polarized armature 12 has assumed its proper position for changing the indication in going from "stop" to "proceed-prepared to stop at next signal." This latter might otherwise result in giving a momentary "proceed" indication.

*Manual control of automatic signals to give "stop" indication*, (Fig. 1.)—The lower element 30 of a compound signal to give the indication of "stop and proceed" may consist of a single lamp 30$^a$ connected between the common return 2 and the "stop" signal lead 4ᶜ through a lead 31 and a switch 32. A second switch 33 is interposed in the lead 18 of the relay 16 in series with the neutral armature 17, these switches being connected together for manual control by an operator, who, if he wishes to take command of the signal and give the indication "stop," opens the switches 33 and 32. The former, by breaking the circuit of the relay 16, closes the circuit of a horizontal row of lamps of the upper signal element and breaks any possible circuit through the other rows thereof, and the latter opens the circuit of the lamp 30 of the lower element. By reversing the position of the switches, the system again becomes automatic, and under control of the current present or absent in the relay 11.

*Safety interlock of circuits of the upper element with the control circuits of the lower element.* (See Fig. 2.)—As shown herein, the lower signal element 30 comprises, in addition to the single lamp 30ª, the additional lamps 30ᵇ, the whole being arranged in a vertical row, which row, when concurrently lighted with the inclined row of the upper element, gives a "proceed-prepared to pass next signal at medium speed" indication. Obviously, the meaning attached to any combination of positions of the elements is immaterial for the purpose of this case, the signification heretofore given being merely for purposes of illustration.

The lamps 30ᵇ are connected between the common return 2 and the lead 5 through a lead 34 and an armature 35. The lead 31 from the single lamp 30ª has one branch (herein called the stop branch) through an armature 36, and another branch (herein called the caution branch) through the armatures 37 and 38 to the lead 5, the armature 36 being so arranged that it opens its branch when the relay 16 is energized and the armature 37 being so arranged that at such time, it closes its branch. The armatures 35 and 38 are controlled by a relay 39, included in a control line 40, which line also includes a neutral armature 41 and a polarized armature 42, controlled by the track-relay 11, the arrangement of these armatures being such that the neutral armature 41 is moved to close the line 40 whenever current is present in the relay 11, and that the armature 42 closes such line when current of such polarity is flowing through the relay 11, as will close the caution signal lead 4ᵇ. Under these conditions, the relay 39 cannot be energized to close contacts at 35 and 38, unless current of proper polarity is flowing through the relay 11 to close the caution signal lead 4ᵇ. The control line 40 further includes an armature 43 controlled by a relay 44 interposed in the caution signal lead 4ᵇ.

With the control line 40 opened for any reason, both branches of the lead 31 from the single lamp 30ª of the lower element, will be broken when the relay 16 is energized, the stop branch at the armature 36 and the caution branch at the armature 38, and thus the indication given by the inclined row of lamps of the upper element is not modified. Under the same supposition, but with the relay 16 deënergized, the stop signal lead 4ᶜ will be closed to battery, and the circuit of the single lamp 30ª will be closed to battery through the stop branch, giving a "stop-then proceed" indication.

Due to the operation of the armatures 41 and 42, the control lead 40 can only be closed when current of proper polarity is flowing in the relay 11 to close the "caution" circuit of the upper element. At this time the magnet 16 is energized and the stop branch of the circuit of lamp 30ª is broken at the armature 36, and the caution branch is closed at the armature 37. Whether or not this last named branch is closed to battery will depend upon whether or not the line 40 and the relay 39 is energized. If energized, both armatures 35 and 38 will be drawn against their corresponding contacts, and not only will the lamp 30ª be illuminated, but also the lamps 30ᵇ, thus giving an illumination of the row of lamps of the lower element simultaneously with the illumination of the inclined row of lamps in the upper element, and displaying a "proceed-prepared to pass next signal at medium speed" indication. It will be noted that the vertical row of lamps of the lower element cannot be illuminated unless the armature 12 is in position to display the "caution" indication, and thus the circuit of the lower element is electrically interlocked with the desired signal indication by the upper element.

As it might happen that some part of the caution lighting circuit of the upper element be interrupted in spite of the fact that the armature 12 is properly positioned to effect the "caution" indication, and as this may result in the display of a vertical row of lamps in the lower element, without the display of any lamps in the upper element, leading to a mis-reading of the indication as "clear," the relay 44 is interposed in the caution line 4ᵇ, so that if current is not actually flowing through the caution lamps 1ᵇ, such relay will be deënergized, opening the control circuit 40 at the relay 43 and thus deënergizing the relay 39 to break the circuits of all the lamps in the lower element.

The control line 40 may lead to any distant point from which it is desired to control the signals, and the character of the means for completing the circuit through the line 40 at such distant point may, obviously, assume many forms, and be controlled in numerous ways without departing from the nature of this invention. A ground-return may be used, and for this reason, the battery 3 may have one end grounded, as shown at G, Fig. 2, or the circuit for the control may have a metallic return and an independent source of current, as shown at 40ª and 40ᵇ Fig. 3.

Obviously, either normally open or normally closed signal circuits may be employed, that is to say, one or more of the lamps may be constantly illuminated, or all of the lamps may be normally extinguished, and only illuminated upon the approach of a train to which an indication is to be given. In the circuit shown in Fig. 1, one of the rows of the upper element are always in closed circuit; but as shown in Fig. 2, a track section 10ᶜ may be provided immediately in front of the signal, and a relay 50 connected across the rails of such section at the end thereof near the signal, while a track battery 51 is connected across the rails of the opposite end of such section. Current will thus normally flow through the relay 50 and hold up the armature 52 thereof out of contact with its coöperating point, such armature being interposed in the signal lead 5, thus breaking the supply circuits for all the lamps. A train approaching the signal will short-circuit the battery 51, deënergize the relay 50 and close the signaling circuit at 52, to cause current to flow through the lamps according to the current in the signaling relay 11.

In the structure just described, the track circuit of the section 10ᶜ is a normally closed circuit. Obviously, it may be a normally open circuit. When of this character, as shown in Fig. 3, a track relay 50ª and a track battery 51ª are connected across the rails 10ᶜ of the approaching section, and as such section is normally open, the armature 52ª of the relay 50ª will fall away from its coöperating contact point. The presence of a train on the section 10ᶜ will close the track circuit, energize the relay 50ª to cause the armature 52ª to close the proper lighting circuit through the lead 5.

In Fig. 3, I have shown a system embodying a combination of all of the features before described. In this figure it will be noted that the manual control switch 32 for the single lamp 30ª is only in the stop branch thereof. Thus the opening of this switch in the structure of this figure, is only effective when a "stop" indication is given by the upper element of the signal, for at other times the branch through the armature 37 would continue, unless otherwise prevented, in spite of the opening of such switch 32. The switch 33 is therefore provided and connected mechanically to switch 32, so that both must open and close together. The circuit of relay 16 is, therefore, opened at the same time as the circuit of lamp 30ª, thus insuring the opening of all proceed circuits and closing the circuits to the horizontal or stop lamps 1ᶜ.

Having thus described my invention, what I claim is:—

1. In a light signal, the combination with lighting circuits and lamps contained therein, of an armature controlling one of such circuits, a second armature controlling the first named circuit and also another of such circuits, and a common control for the two armatures, the last named armature having a greater time interval than the first-named armature.

2. In a light signal, the combination with a plurality of proceed lighting circuits, of a stop lighting circuit, an armature controlling the proceed circuits, a second armature controlling the proceed circuits and the stop circuit, and a common control for the two armatures, the last named armature having a greater time interval than the first named armature.

3. In a light signal, the combination with lighting circuits, and lamps contained therein, of a track relay, an armature actuated thereby and controlling one of said circuits, a second relay whose circuit is controlled by the first relay, and an armature actuated by the second relay, controlling the first named circuit and also another of such circuits, the last named armature having a greater time interval than the first named armature.

4. In a light signal, the combination with a plurality of proceed circuits, of a stop lighting circuit, a track relay, means for determining current flow through the said relay and the character of such flow, a polarized armature actuated by the said relay and controlling according to the polarity of the current therein the proceed circuits, a neutral armature actuated by the said relay, a second relay whose circuit includes the neutral armature of the first relay, and an armature actuated by the second relay for completing the proceed circuits, or the stop circuit, the movements of the last named armature having a greater time interval than that of the polarized armature.

5. In a signaling system, the combination with an upper element, of a lower element, proceed and stop signal circuits for the upper element, a signal circuit for the lower element, a track relay and a relay controlled thereby for controlling the signaling circuits of the upper element, the last named relay having an armature which when such relay is deënergized, opens the proceed and closes the stop circuits, and manual interconnected means for opening the circuit of the last named relay and the signal circuit of the lower element.

6. In a signaling system, the combination with an upper element having proceed and stop signal circuits, means for controlling said circuits, a lower element having a signal circuit, a circuit maker in the circuit of the lower element, and a circuit actuating the said circuit maker to close said circuit including contacts closed by the said means when a proceed circuit of the upper element is closed.

7. In a signaling system, the combination with an upper element having proceed circuits, and stop signal circuits, of a polarized track relay for closing either of the proceed circuits, and effecting when deënergized, the closing the stop circuit, a lower element having a signal circuit, a circuit breaker in said last named circuit, a circuit actuating the said circuit breaker to close the signal circuit, including a neutral and a polarized armature controlled by the track relay.

8. In a signaling system, the combination with an upper element having proceed circuits, and stop signal circuits, of a track relay having a polarized armature for closing either of the proceed circuits, and a neutral armature, a second relay whose circuit includes the said neutral armature, and which has an armature which, when deënergized, closes the stop circuit, a lower element having two signaling circuits, one of which comprises a caution branch reversely controlled by the second relay in respect to the stop signal circuit of the upper element, and a stop branch controlled by the said second relay in the same manner as the stop signal circuit, connected circuit breakers in the caution branch of the said circuit of the lower element, and of the other circuit of said element, and a control circuit for closing said circuit breakers, including a neutral and polarized armature controlled by the track relay.

9. In a light signaling system, the combination with an upper element having light signaling circuits of a lower element intended for display with an indication of the upper element, a relay in the corresponding lighting circuit of the upper element, and means for causing the display of the lower element, said means including a circuit containing contacts broken when the said relay is deënergized.

10. In a signaling system, the combination with an upper signaling element having proceed circuits, and a stop lighting circuit, of a track relay having a polarized armature for closing of either of the proceed circuits, and a neutral armature, a second relay whose circuit includes the said neutral armature and which has an armature which, when deënergized, closes the stop circuit, a lower signaling element having two signaling circuits intended for closing simultaneously with corresponding circuits of the upper element, one of such signaling circuits being reversely controlled by the second relay in respect to the stop signal circuit of the upper element, and the other of the said circuits of the lower element including a circuit breaker, a control circuit for closing said circuit breaker, a relay in one of the lighting circuits of the upper element, neutral and polarized armatures in the control circuit controlled by the track relay, and a relay in the control circuit controlled by the relay in the lighting circuit of the upper element.

11. In a signaling system, the combination with a sectionalized track, of light position signals and lighting circuits therefor, a battery, a normally opened circuit breaker interposed between the lighting circuits and the battery, means actuated by the presence of a train on a section of the track in advance of, but adjacent to the signals, to close said circuit breaker, and means for determining which of the lighting circuits is then energized.

12. In a signaling system, the combination with an upper signaling element having signaling circuits, of a lower signaling element having signaling circuits, a relay in series with a signaling circuit of the upper element and circuit breakers controlled thereby to break a signaling circuit in the lower element on failure of the current in the signaling circuit of the upper element.

In testimony whereof I have signed my name.

ALEXANDER H. RUDD.